(12) United States Patent
Mellquist et al.

(10) Patent No.: US 10,206,092 B1
(45) Date of Patent: Feb. 12, 2019

(54) AUTOMATIC DISCOVERY

(71) Applicant: Hewlett Packard Enterprise Development LP, Houston, TX (US)

(72) Inventors: Peter Erik Mellquist, Roseville, CA (US); Joao Claudio Ambrosi, Rio Grande do Sul (BR); Bryan Stiekes, Brownstown Township, MI (US); Raul Ney da Silva Lima, Fort Collins, CO (US); Victor Hugo Rebelo Rodrigues, Fort Collins, CO (US); Alex Ferreira Ramires Trajano, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/721,677

(22) Filed: Sep. 29, 2017

(51) Int. Cl.
*H04W 8/00* (2009.01)
*H04W 8/02* (2009.01)

(52) U.S. Cl.
CPC ............. *H04W 8/005* (2013.01); *H04W 8/02* (2013.01)

(58) Field of Classification Search
CPC .................................. H04W 8/005; H04W 8/02
See application file for complete search history.

(56) References Cited

U.S. PATENT DOCUMENTS

| 9,286,047 | B1 | 3/2016 | Avramov et al. |
| 9,413,602 | B2 | 8/2016 | Mohandas et al. |
| 2006/0092861 | A1 | 5/2006 | Corday |
| 2010/0278076 | A1* | 11/2010 | Reddy ................. H04L 41/0806 370/254 |
| 2013/0064102 | A1 | 3/2013 | Chang et al. |
| 2014/0078935 | A1* | 3/2014 | Sun ....................... H04W 8/005 370/254 |
| 2014/0372576 | A1 | 12/2014 | Mohandas et al. |
| 2016/0210161 | A1 | 7/2016 | Rosset et al. |
| 2016/0234095 | A1* | 8/2016 | Shetty ..................... H04L 45/02 |

OTHER PUBLICATIONS

Wright, J. et al., a Dynamic Infrastructure for Interconnecting Disparate ISR/ISTAR Assets (the ITA Sensor Fabric) (Research Paper), Jul. 2009, 8 Pgs.

* cited by examiner

*Primary Examiner* — Afshawn M Towfighi
(74) *Attorney, Agent, or Firm* — Hewlett Packard Enterprise Patent Department

(57) ABSTRACT

Some examples provide a system to automatically discover network devices. The system enables a network device discovery protocol with a transmit mode and a receive mode on a network device. The system enables an auxiliary communication protocol on the network device. The system broadcasts the network device discovery protocol records from the network device including local neighbors and connectivity information. The system engine processes topological information using the auxiliary communication protocol and timing cycles to update age of a set of topology information records.

20 Claims, 7 Drawing Sheets

AUTOMATIC DISCOVERY

BACKGROUND

Hyper converged and converged infrastructure includes servers, storage, networking, and integrated software and services. These systems are designed to address the cost and complexity of data center operations and maintenance by pulling the IT components together into a single resource pool so they are easier to manage and faster to deploy.

DRAWINGS

DETAILED DESCRIPTION

Figure 1:
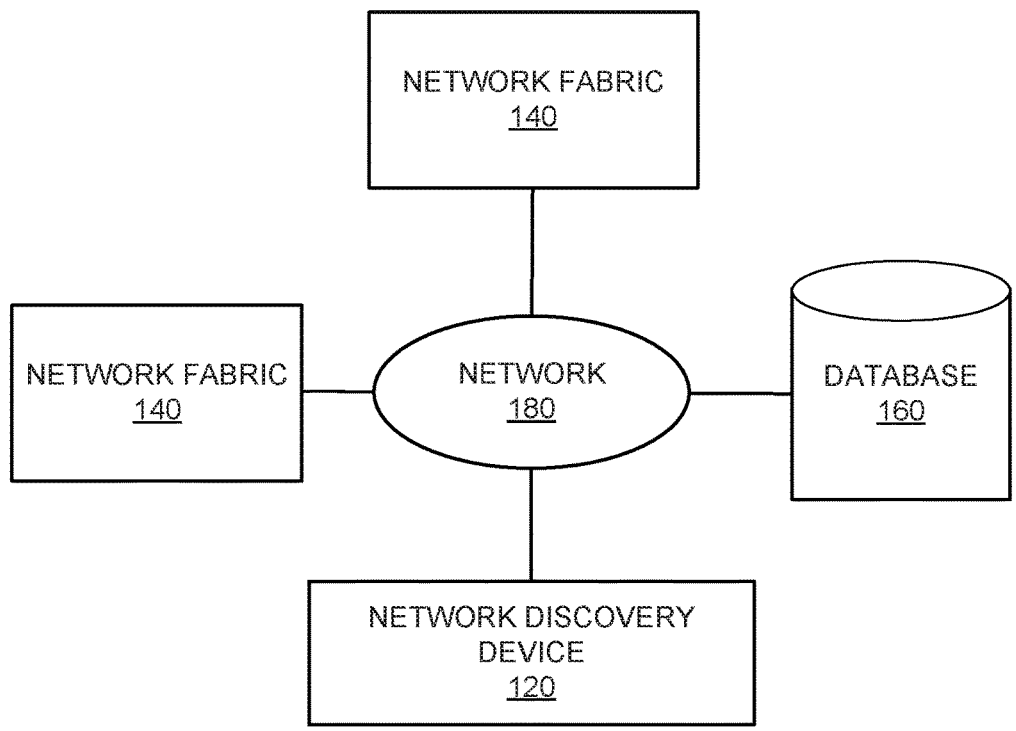
FIG. 1 illustrates an overview of a system to automatically discover network devices according to an example.

Hyper converged and converged infrastructure systems (hereinafter converged infrastructure systems) provide a single resource pool for IT components together into a solution that is easier to manage and faster to deploy. As part of the solution, the network fabric provides for the connectivity of the infrastructure allowing the overall solution to function. A key challenge in setting up and administering converged infrastructure is that the infrastructure cannot be remotely managed before a network fabric itself is assembled and fully functional. Manually setting up a network fabric is time consuming and error prone as this requires much information regarding all the connected infrastructure elements, how they are connected, and configuration of network protocols and network security. All of this information must be accurately programmed into the infrastructure components before use. Discovery, assembly, and full functionality of a converged infrastructure network fabric in an automated manner is provided herein. Key features include the automatic discovery of all converged infrastructure elements, automatic learning of the topological relationships between these elements, and automatic base configuration of the network fabric.

Converged infrastructure hardware must be physically setup based on design requirements and desired capacities. For example, a set of servers and storage within a set of racks must all be connected with power and network connectivity for some desired topology. The desired topologies may be based on standard network architectures, such as leaf-spine architecture, and are configured specifically for the customer workloads to be run on top of the infrastructure and can include preferences for performance and/or high availability. After the infrastructure has been setup, software configurations must be applied to the network fabric and infrastructure within. This includes configuration of networking protocols and desired settings. Provisioning the network fabric properly is a critical step and is difficult. Some of the key problems with getting the network fabric provisioned correctly are solved by the network discovery device functions, system, and method provided herein.

For example, manual processes are difficult, tedious and error prone. Many of the setup and configuration steps require manual intervention and deep knowledge about the network fabric specifics, especially when errors or anomalies exist. This is both time consuming and error prone. Some automation tools exist but these are not well integrated into the overall solution. The network device functions, system, and methods herein automate these steps through automatic network fabric discovery, topology and configuration making this an integral part of the solution. Business agility is improved by enabling faster and easier utilization of infrastructure.

Additionally, manual processes often result in incorrect set-up of hardware. A network fabric is physically setup to connect servers, storage and up-links into the customer's data center. The resultant set-up is complex and often incorrect. In these cases, customers are confronted with complex physical network fabric changes which may require help from the network vendor or a network administrator with deep knowledge. This results in down time and unrealized infrastructure. The network discovery device functions, system, and methods herein can help pin-point anomalies and errors automatically so that network configuration errors and mistakes can be solved and fixes can be applied.

Examples of systems to automatically discover network devices are provided herein. The system includes a discovery engine, record engine, and a topology engine. The discovery engine enables a network device discovery protocol with a transmit mode and a receive mode on a network discovery device. The discovery engine also enables an auxiliary communication protocol on the network device. The record engine broadcasts the network device discovery protocol records from the network device including local neighbors and connectivity information. The topological engine processes topological information using the auxiliary communication protocol and timing cycles to update age of a set of topology information records.

FIG. 1 illustrates an overview of a system to automatically discover network devices according to an example. System 100 may be implemented in a number of different configurations without departing from the scope of the disclosed examples. In FIG. 1, system 100 may include a network discovery device 120, at least two network fabrics 140, a database 160, and a network 180 for connecting network discovery device 120 with database 160 and/or network fabrics 140.

Network discovery device 120 may be a computing system that performs various functions consistent with disclosed examples, such as automatically discovering network devices. For example, network discovery device 120 may enable a network device discovery protocol, such as a link level discovery protocol, with a transmit mode and a receive mode on a network device and enable an auxiliary communication protocol, such as a simple service discovery protocol, on the network device. Network discovery device 120 may also determines if an address is allocated for a management interface on the network device. Prior to enabling the network device discovery protocol, network discovery device 120 may determine if the network device is provisioned.

Network discovery device 120 may broadcast the network device discovery protocol records from the network device including local neighbors and connectivity information.

Network discovery device 120 may process topological information using the auxiliary communication protocol and timing cycles to update age of a set of topology information records. For example, network discovery device 120 marks topological information regarding the age of stored records and inventory. For example, when no renewing information is received from each network device on a network during a first period of time and marks the network device with a first marker, such as a stale identifier. When determines that no renewing information is received from a network device on a network during a second period of time and marks the network device with a second marker, such as an obsolete identifier and the network device will be disregarded in all active operations and current topology representations.

For example, the at least two network fabrics 140 may be any two network connections using, two protocols, a network device discovery protocol, such as a link level discovery protocol, and an auxiliary communication protocol, such as simple service discovery protocol, the protocols and any associated information or records may be stored in database 160.

Database 160 may be any type of storage system configuration that facilitates the storage of data. For example, database 160 may facilitate the locating, accessing, and retrieving of data (e.g., SaaS, SQL, Access, etc. databases, XML files, etc.). Network discovery device 120 may populate database 160 with database entries generated by network discovery device 120, and store the database entries in database 160. Database 160 can be populated by a number of methods. For example, database 160 may be populated with network device discovery protocol records.

Network 180 may be any type of network that facilitates communication between components, such as network discovery device 120, network fabrics 140, and database 160. For example, network 180 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1, shows one network discovery device 120, two network fabrics 140, database 160, and network 180, system 100 may include any number of components 120, 140, 160, and 180, as well as other components not depicted in FIG. 1. System 100 may also omit any of components 120, 140, 160, and 180. For example, network discovery device 120 and network fabrics 140 may be directly connected instead of being connected via network 180.

Figure 2:
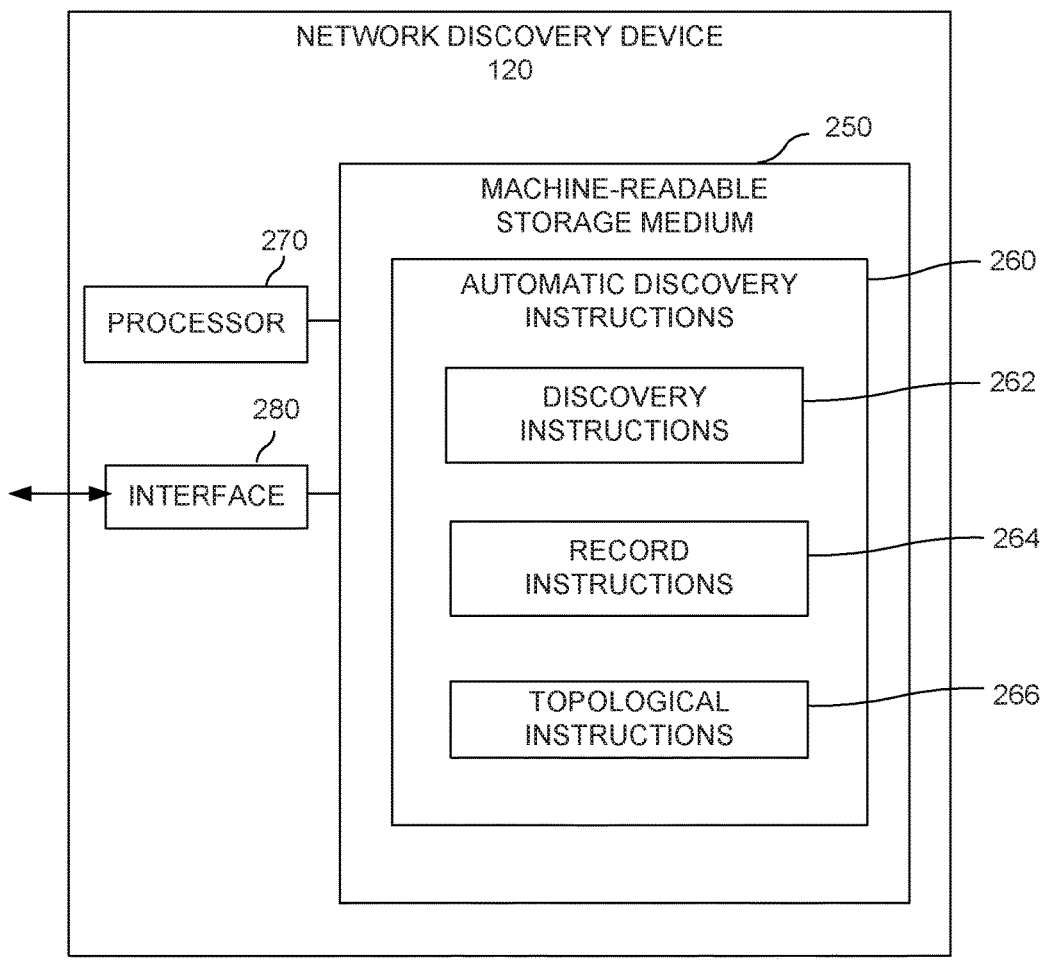
FIGS. 2-3 illustrate network discovery devices to automatically discover capable and enabled devices according to examples.
Figure 3:
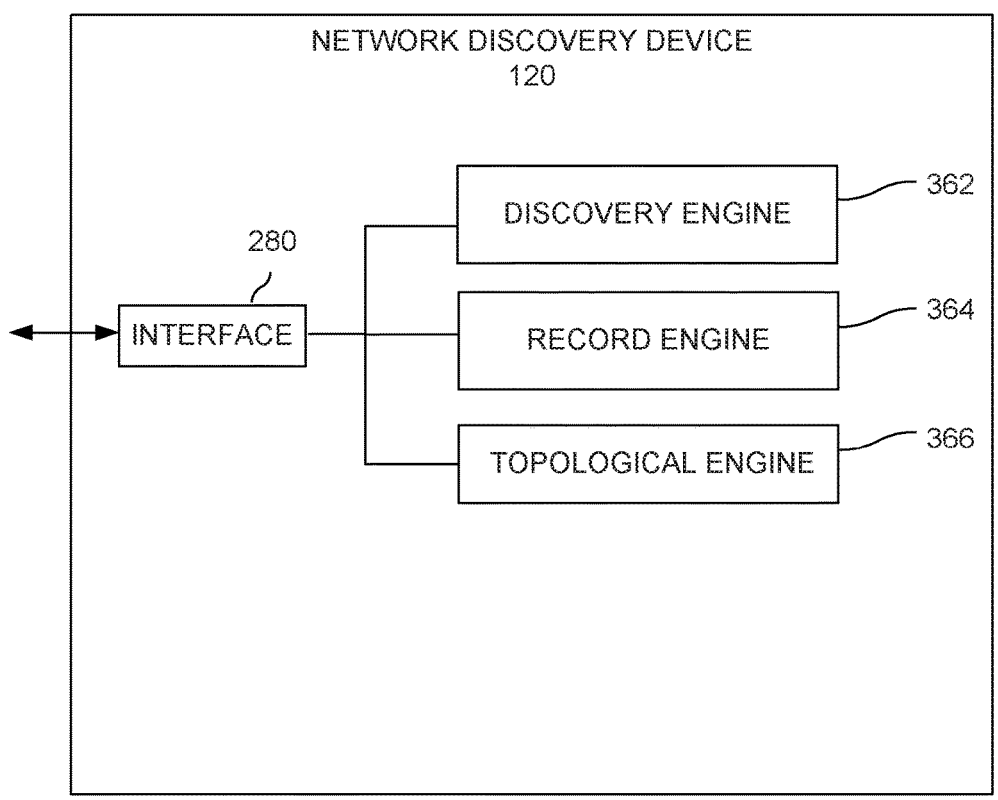

FIGS. 2-3 illustrate network discovery devices to automatically discover capable and enabled devices according to examples. Referring to FIG. 2, a network discovery device 120 is illustrated. In certain aspects, network discovery device 120 may correspond to multiple network discovery devices 120 of FIG. 1. Network discovery device 120 may be implemented in various ways. For example, network discovery device 120 may be a special purpose computer, a server, a mainframe computer, a computing device executing instructions that receive and process information and provide responses, and/or any other type of computing device. In the example shown in FIG. 2, network discovery device 120 may include a machine-readable storage medium 250, a processor 270, and an interface 280.

Processor 270 may be at least one processing unit (CPU), microprocessor, and/or another hardware device to execute instructions to perform operations. For example, processor 270 may fetch, decode, and execute automatic discovery instructions 260 (e.g., instructions 262, 264, and/or 266) stored in machine-readable storage medium 250 to perform operations related to examples provided herein.

Interface 280 may be any device that facilitates the transfer of information between network discovery device 120 and other components, such as network fabrics 140 and/or database 160. In some examples, interface 280 may include a network interface device that allows network discovery device 120 to receive and send data to and from network 180. For example, interface 280 may retrieve and process data related to generate a natural language programming tool from database 160 via network 180.

Machine-readable storage medium 250 may be any electronic, magnetic, optical, or other physical storage device that stores executable instructions. Thus, machine-readable storage medium 250 may be, for example, memory, a storage drive, an optical disc, and/or the like. In some implementations, machine-readable storage medium 250 may be non-transitory, such as a non-transitory computer-readable storage medium, where the term "non-transitory" does not encompass transitory propagating signals. Machine-readable storage medium 250 may be encoded with instructions that, when executed by processor 270, perform operations consistent with the examples herein. For example, machine-readable storage medium 250 may include instructions that perform operations that automatically discover network devices. In the example shown in FIG. 2, the machine-readable storage medium 250 may be a memory resource that stores instructions that when executed cause a processing resource, such as processor 270 to implement a system to generate a natural language programming tool. The instructions include automatic discovery instructions 260, such as discovery instructions 262, record instructions 264, and topological instructions 266.

Discovery instructions 262 may function to collect a set of network device discovery protocol results about network devices and insert the network device discovery protocol results into a database. For example, when discovery instructions 262 are executed by processor 270, discovery instructions 262 may cause processor 270 of network discovery device 120, and/or another processor to collect a set of network device discovery protocol results about network devices and insert the network device discovery protocol results into a database. An example of the network device discovery protocol includes a link level discovery protocol (LLDP). The discovery instructions 262 may also enable a network device discovery protocol, such as a link level discovery protocol, with a transmit mode and a receive mode on a network device, and enable an auxiliary communication protocol, such as simple service discovery protocol, on the network device. The discovery engine may also determine if an address is allocated for a management interface on the network device Record instructions 264 may function to send and receive a discovery notification to and from other nodes using an auxiliary communications protocol, capable of reaching non-directly connected devices. For example, when record instructions 264 are executed by processor 270, record instructions 264 may cause processor 270 of network discovery device 120, and/or another processor to send and receive a discovery notification to and from other nodes using an auxiliary communications protocol, capable of reaching non-directly connected devices. An example of the auxiliary communication protocol may include a simple service discovery protocol. The record instructions 264 may also broadcast the network device discovery protocol records from the network device including local neighbors and connectivity information.

Topological instructions 266 may function to that coalesces and maintains a set of records related to a network device list, a neighbor information list, an interface information list, and direct connections among the devices with respect to their interfaces. For example, when topological instructions 266 are executed by processor 270, topological instructions 266 may cause processor 270 of network discovery device 120, and/or another processor to coalesce and maintain the set of records related to the network device list, the neighbor information list, the interface information list, and direct connections amount devices. The topological instructions 266 may also process topological information using the auxiliary communication protocol and timing cycles to update age of a set of topology information records. For example, topological information records regarding the age of stored records. Topological instructions 266 are used to determine that no renewing information is received from each network device on a network during a first period of time and mark the network device with a first marker, such as a stale identifier. Topological instructions 266 are used to determine that no renewing information is received from a network device on a network during a second period of time and mark the network device with a second marker, such as an obsolete identifier. The second marker may result in the network device being disregarded in all active operations and current topology representations.

The topological instructions 266 may maintain a local copy of a network fabric and the set of topological information records for the network device including inventory and age. Examples of the steps involved in automatically discover network devices are described in further detail below with respect to, for example, FIGS. 4-7. Moreover, the discovery, record, and topological instructions (262, 264, 266) may be repeated at timed intervals.

Referring to FIG. 3, network discovery device 120 is illustrated to include a discovery engine 362, a record engine 364, and a topological engine 366. In certain aspects, network discovery device 120 may correspond to network discovery device 120 of FIGS. 1-2. Network discovery device 120 may be implemented in various ways. For example, network discovery device 120 may be a computing system and/or any other suitable component or collection of components that automatically discover network devices.

Interface 280 may be any device that facilitates the transfer of information between network discovery device 120 and external components. In some examples, interface 280 may include a network interface device that allows network discovery device 120 to receive and send data to and from a network. For example, interface 280 may retrieve and process data related to automatically discover network devices from network discovery device 120 and/or database 160.

Engines 362, 364, and 366 include hardware and/or combinations of hardware and programming to perform functions provided herein. Moreover, the modules (not shown) can include programing functions and/or combinations of programming functions to be executed by hardware as provided herein. For example, the instructions for the engines may be processor-executable instructions stored on a non-transitory machine-readable storage medium and the hardware for the engines may include a processor to execute those instructions. In some examples, the functionality of engines 362, 364, and 366 may correspond to operations performed by network discovery device 120 of FIGS. 1-2, such as operations performed when automatic discovery instructions 260 are executed by processor 270. When discussing the engines and modules, it is noted that functionality attributed to an engine can also be attributed to the corresponding module and vice versa. Moreover, functionality attributed to a particular module and/or engine may also be implemented using another module and/or engine.

The system further including an initiation engine to determine if the network device is provisioned.

In FIG. 3, discovery engine 362 may represent a combination of hardware and instructions that perform operations similar to those performed when processor 270 executes discovery instructions 262. Similarly, record engine 364 may represent a combination of hardware and instructions that perform operations similar to those performed when processor 270 executes record instructions 264, and topological engine 366 may represent a combination of hardware and instructions that perform operations similar to those performed when processor 270 executes topological instructions 266.

Figure 4:
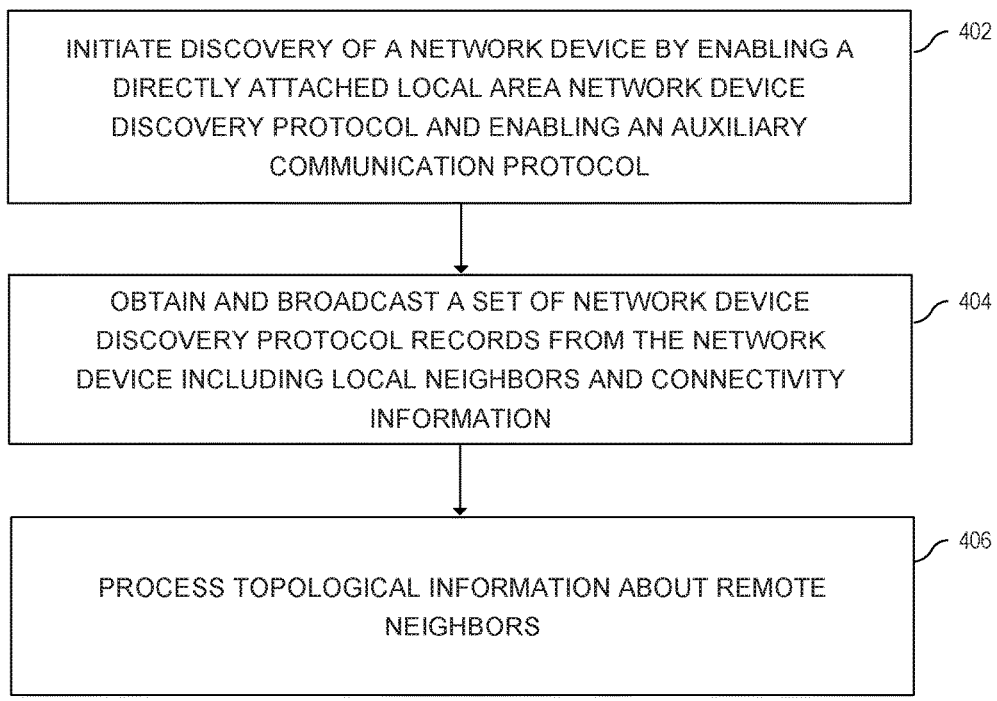
FIG. 4 illustrates a flow diagram of a method to automatically discover network devices according to an example.

FIG. 4 illustrates a flow diagram of a method to automatically discover network devices according to an example. Although execution of process 400 is described below with reference to system 100, other suitable systems and/or devices for execution of at least one step of process 400 may be used. For example, processes described below as being performed by system 100 may be performed by network discovery device 120, network fabrics 140, and/or any other suitable device or system. Process 400 may be implemented in the form of executable instructions stored on a storage device, such as a machine-readable storage medium, and/or in the form of electronic circuitry.

Figure 6:
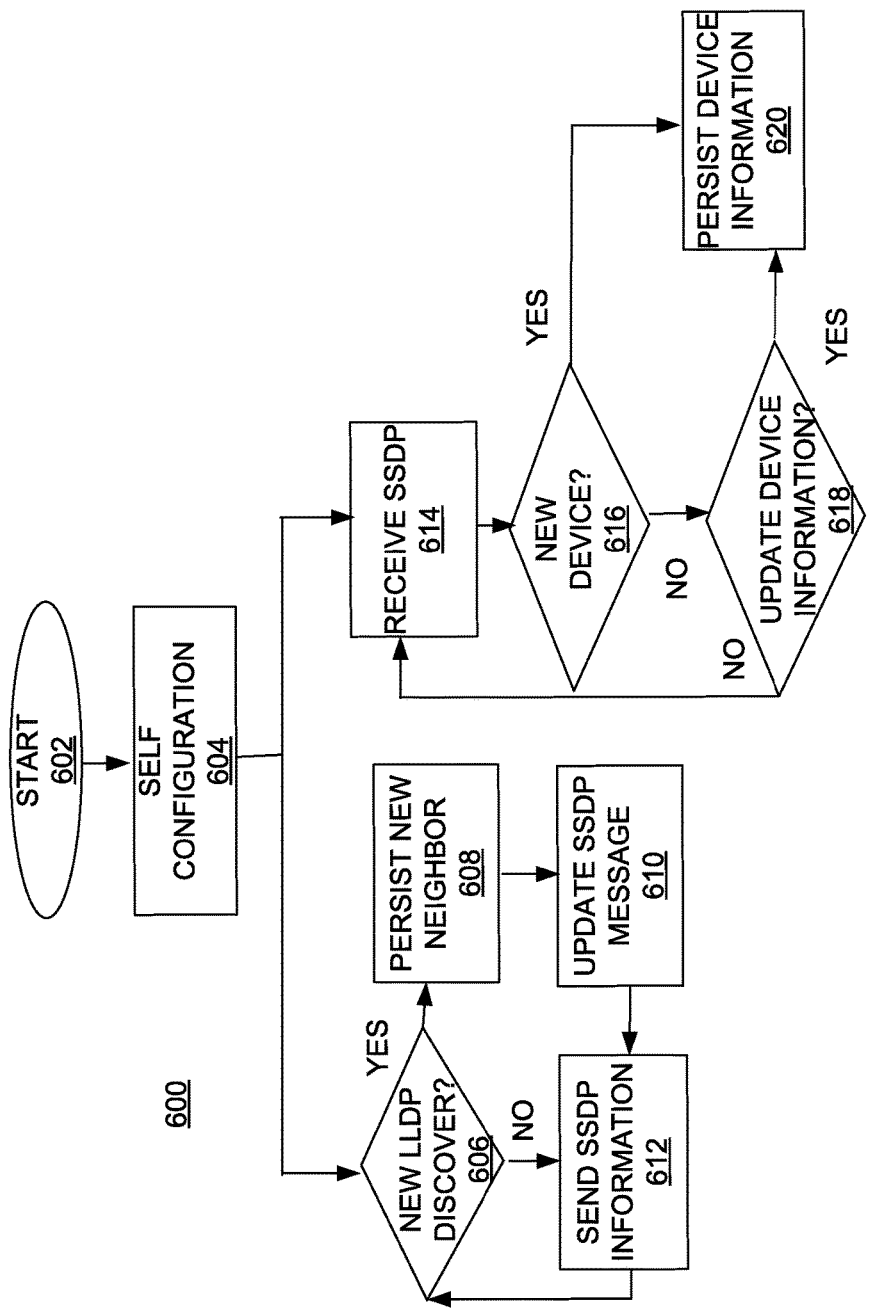
FIG. 6 illustrates a flow chart of the order and flow inside a network discovery device according to an example.
Figure 7:
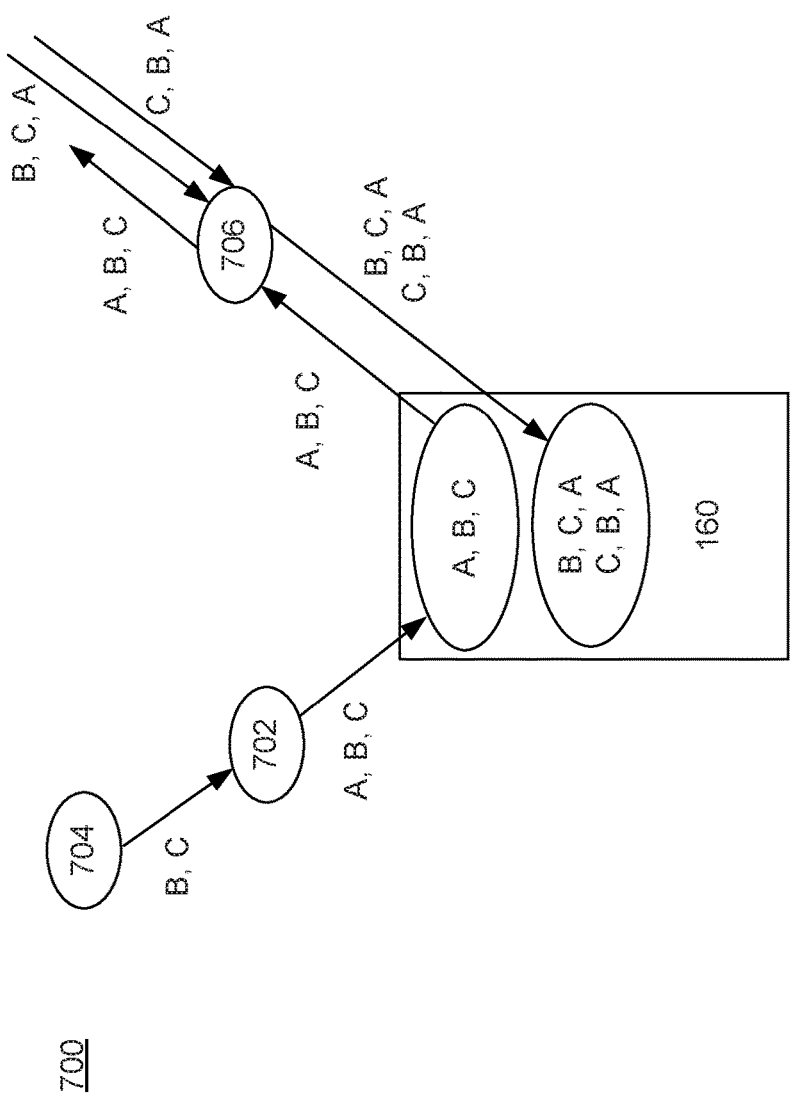
FIG. 7 illustrates a flow of discovery information between functional components of a network discovery device in a system according to an example.

Process 400 may start by initiating discovery of a network device by enabling an attached local area network device discovery protocol, for example, a link level discovery protocol (LLDP) may be used, and enabling an auxiliary communication protocol, using for example a simple service discovery protocol (SSDP), that allows devices not directly connected to exchange information on the network device (step 402). For example, network discovery device 120 may enabling the local area network device discovery protocol includes enabling of a transmit mode and a receive mode for a network device. The execution of the discovery instructions 262 may also cause processor 270 of network discovery device 120, and/or another processor to enable the local area network device discovery protocol. FIGS. 6-7 illustrates an examples of enabling the local area network device discovery protocol.

Process 400 may also include obtaining and broadcasting a set of network device discovery protocol records from the network device including local neighbors and connectivity information (step 404). The network device discovery protocol records may be stored in a storage device, such as database 160, and network discovery device 120 and/or network fabrics 140 may query database 160 to obtain protocol and network device information.

Process 400 may also include processing topological information about remote neighbors (step 606). For example, network discovery device 120 may correlate and combine connectivity and node (network devices) information, marking inventory and age of a set of topology information records using the auxiliary communication protocol and timing cycles to update age of the set of topology information records. An example of processing of topological information is illustrated in FIGS. 6-7.

The process 400 may repeat the steps (402, 404, 406) of initiating, obtaining, and processing at timed intervals. The process 400 may further include sending a notification via the auxiliary communication protocol to indicate when a network device is being shut down. The network discovery device 120 may be used to manage notifications transmitted via the network fabrics 140 and stored in the database 160.

Figure 5:
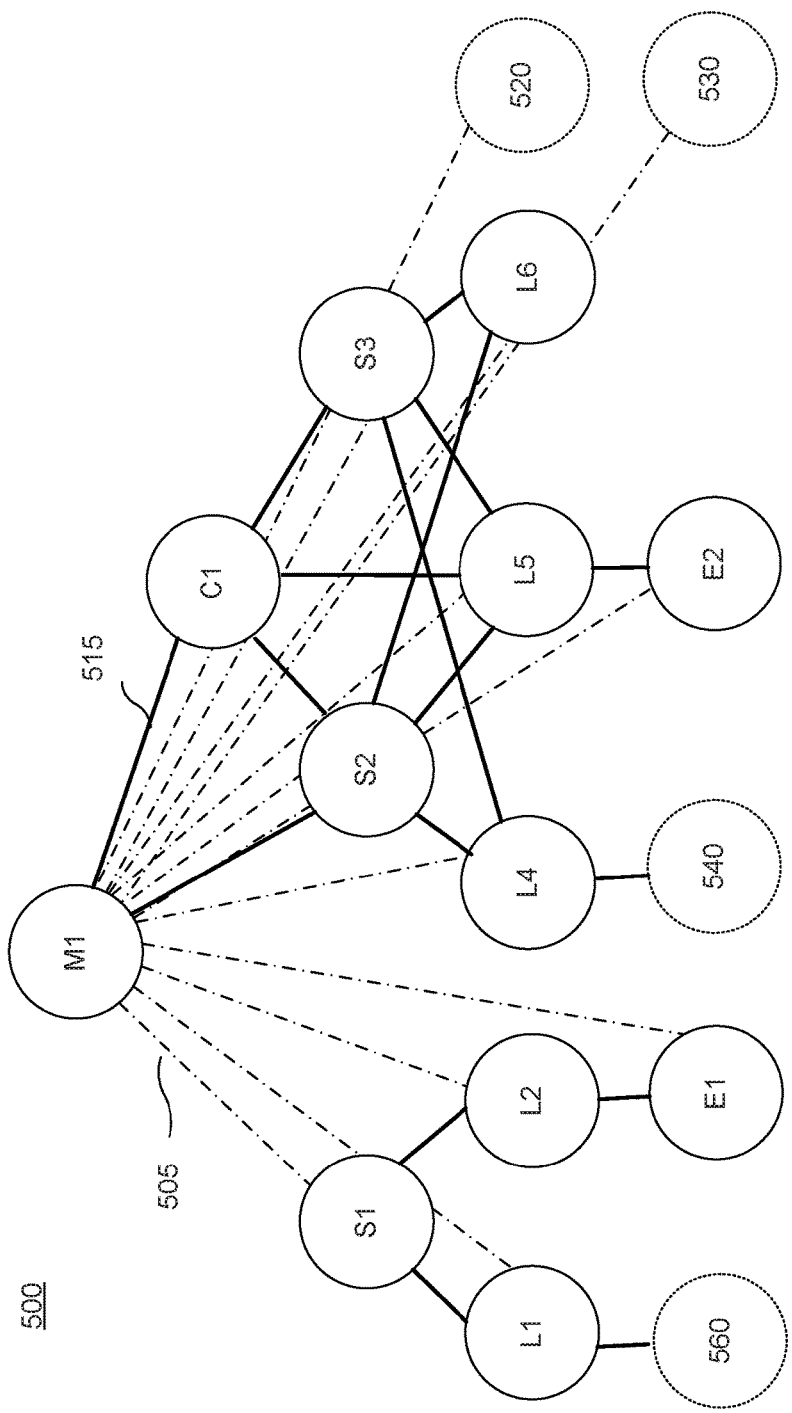
FIG. 5 illustrates a network topology that was be successfully handled with a network discovery device according to an example.

FIG. 5 illustrates a network topology 500 that was be successfully handled with a network discovery device according to an example. Network topography 500 include multiple layers of nodes with switch device roles. The basic capable network elements or capable and enabled devices, referred to as network discovery devices herein, supported are network switches and routers, both physical and virtual devices, and any other network-connectable devices, such as virtual machines, containers, physical servers, workstations, and storage units, among other equipment. Network discovery devices are network element devices that performs the required functions and have been equipped with logic for automatic discovery and is, or can be, properly introduced to the system or in other words physically or logically connected to the network fabric, powered-up and turned on for normal operation. For example, network discovery devices have the self-discovery function as an add-on feature. For the complete operation as described above it is required that the network elements can access a DHCP (v4 or v6) function in the network, or have the capabilities for functioning in IPv6 link-local mode. As described above, a network discovery devices are network elements (e.g. a switch, a server, etc.) that are enabled for self-discovery and also to maintain and share connectivity and topology information, by utilizing the steps and functionality described below in FIGS. 6-7. representation even when non-capable/not-enabled devices (which means they either do not have the here proposed discovery function, or that function is not-enabled or malfunctioning For example node M1 can be a simple network switch device, or represent all the network hubs, switches, bridges and routers devices that makes the management network, mating management connections 505 with the other nodes. Node M1 can comprise capable and enabled devices, or, as shown in FIG. 5 a non-capable and not-enabled device. Node M1 is connected via management connections 505 to other network discovery devices, such as nodes C1, S1-S3, L1-L6, E1-E2, and 560. Node M1 is also connected via management connections 505 too some non-capable or not-enabled devices, such as nodes 520, 540, and 560. Node C1 has a core role and includes a connection to the management node M1 via management connection 505 and service or production connections 515 with nodes S2 and S3 having spine roles. Nodes S2-S3 are connected to leaf role nodes L4-L6 via service or production connections 515. Leaf role node 520 is a non-capable or not-enabled device connected to a network discovery device (i.e., capable and enabled node 530). Leaf role node L4 is connected to a non-capable or not-enabled device 540 via service or production connections 515 and leave L5 is connected to extension node E2 via service or production connections 515. Similarly, spine node S1 is connected via service or production connections 515 to leave role nodes L1-L2. Node L1 is connected via service or production connections 515 to a non-capable or not-enabled device 560 and L2 is connected to extension role node E1 via service or production connections 515. An accurate topology representation may be established even when non-capable or not-enabled devices (i.e., devices either without discovery functionality, or that function is not-enabled or malfunctioning) are present, given they are not spine elements. Specific processes may be applied to the nodes in the topography to automatically discover and build an accurate fabric topology during the entire life cycle of the network fabric within the converged infrastructure, and automatic provisioning of the infrastructure during initialization. The process is flexible and may be deployed within a converged infrastructure in various manners. FIGS. 6-7 provide examples of the order and flow within network discovery device 120.

FIG. 6 illustrates a flow chart 600 of the order and flow inside a network discovery device according to an example. FIG. 7 illustrates a flow chart 700 of discovery information between functional components of a network discovery device in a system according to an example. Referring to FIG. 6, the network device starts (step 602) and self-configuration is initiated (step 604). After self-configuration, the discovery and topology information is automatically built within the network discovery device and updated as each network discovery device is introduced to or removed from the network fabric. Networking protocols such as Link Layer Discovery Protocol (LLDP) and Simple Service Discovery Protocol (SSDP), as illustrated in FIG. 7 are examples of protocols that may be used to determine connectivity. The inventory and topology representations reflect connectivity changes at any network discovery device that impacts the topology.

Network discovery devices complete startup procedure, including the ability to access the network. Network discovery devices are booted and go through their normal startup procedure. Network discovery devices can access the network in any standard manner including but not limited to Dynamic Host Configuration Protocol (DHCP), static address allocation, or other mechanism. Network discovery devices may exist on a dedicated management network or the data network which is shared with customer data. All network discovery devices in the same network, once passed the initial startup phase, will be aware of the network fabric inventory and the topology, in a fully redundant fashion.

Network discovery devices determine if address is allocated for management interface on device. This is a check if an IP was obtained and set for the local management port. This information is used to determine if interface is on management network, such as M1 with management connections 505 illustrated in FIG. 5 or data network and will be used as part of the data model, such as service or production connections 515 illustrated in FIG. 5. Additionally, a check is performed to determine for the existence of the (local) special provisioned-ready semaphore within the network discovery device. This is used to signal that a device is already been provisioned and therefore does not require provisioning.

At step 606, a device discovery protocol is enabled. For example, a network switch or router includes a protocol for finding out other devices which are plugged into ports on itself. The protocol is, for example, an industry standard protocol called Link Layer Discovery Protocol (LLDP) which is turned on in transmit and receive modes in order for devices to receive and publish discovered information. In addition to LLDP, other methods or protocols may be used to gather discovery information.

An external discovery protocol is enabled at step 616. For example, the external protocol may be an auxiliary communication protocol that can be discovered on the network as a managed entity and set of services. Step 616 illustrates the standard protocol Simple Service Discovery Protocol (SSDP) enabled for the local management port. This example utilizes SSDP; however, discovery information may be gathered using other methods or protocols.

Referring to step 608, LLDP information is harvested and filtered about local neighbors and local connectivity collected by the network discovery device. In particular extract local ports information and connected neighbors of interest (e.g. switching network elements only). Any updates or new neighbor information collected via a SSDP is then sent back to the step 606 for the LLDP to maintain any updated discovery information. For example, referring to FIG. 7, a discovery device 702 receives LLDP information 704 that is recorded and/or updated for local neighbors and connectivity information obtained from LLDP into the local discovery database, e.g. 160 that tuples types including 1) device information that includes detailed information about each network discovery device, 2) neighbor information about device types and local and remote connectivity information, and 3) interface information about each port of the each device.

When local information changes, local neighbor information is updated, by for example creating and sending SSDP notifications about current local neighbors and local connectivity (FIG. 6, steps 610, 612, 614, 616, 618, 620). Referring to FIG. 7, a share service 706 listens and sends discovery information to and from network discovery devices using a SSDP notification. Additionally, a special SSDP notification may be sent in advance of a network discovery device being shut down gracefully. Topological information about remote neighbors is processed for example by a share service 706 of FIG. 7 that receives, processes, and filters SSDP notifications about remote neighbors and connectivity. Relevant remote neighbors and remote connectivity received from SSDP notifications into the local discovery database 160. For example, as illustrated in steps 614-620 of FIG. 6, SSDP messages are received 614 and a determination is made if the message is from a new network discovery device in step 616. For existing network discovery devices a determination of updates is made in step 618. When there are no updates the cycle continues back at step 614, but when there are updates or a new network discovery device, discovery information is obtained from the network discovery device via step 620 prior to the cycle returning to step 614.

Inventory and topology information is recorded for network discovery devices considering the age of the stored information in the local discovery database 160. Topography information not renewed or expired information, which has not been updated during two specified timeout periods will be marked accordingly. For example, at least two main time-out periods are important to be considered, such as two adjustable cycle time durations. During the time period of the first adjustable cycle time, if no renewing information is received for each device registered into the database, all the associated records with that network discovery device can be marked as stale, or something similar. This mechanism aims to maintain the device inventory and the topology information up-to-date, to detect possible device, connections or network problems, or modifications in a continued, cyclic validation and confirmation procedure. A stale device and its connections will be considered in all active operations and current topology representation, optionally shown with a different color or label for differentiation. A second adjustable cycle time duration, usually a multiple of the duration period of the first adjustable cycle time, marks records associated with that device obsolete or something similar if no renewing information is received for a given network discovery device within the second adjustable cycle time period. An obsolete device and its connections is disregarded in all active operations and current topology representation. Obsolete records may be kept or stored for historical reasons, troubleshooting and accounting, or other uses.

Steps described in FIGS. 6-7 may be repeated at defined adjustable intervals, ranging from milliseconds to seconds. For example, steps 606 and 614 of FIG. 6 and the functionality illustrated in 702, 704, 706, and 160 of FIG. 7 are repeated at the defined adjustable intervals. The result of the process and steps above is that all capable devices will have a local copy of the concerned network fabric, such as capable and enabled devices, interfaces, and connectivity, and topology. The discovery and topology is constantly occurring with the effect of providing an up to date model of the physical converged infrastructure network fabric.

Automatic discovery focuses on making converged infrastructure easy to setup and easy to use in an automated manner that was previously not possible. Prior solutions used error prone manual steps. Automatic discovery eliminates the inefficiencies and inflexibility of manually controlled infrastructure with software-defined agility and automation. Specifically, automatic discovery eases and accelerates the deployment, configuration and administration of a network fabric, through self-discovery mechanisms and the automatic exchange of relevant connectivity and network element information among the converged infrastructure devices. No external or additional physical elements, or high profile devices, such as a network controller or management server, which are the usual propositions in traditional network management systems, to provide similar benefits are required. Hence, automatic discovery offers lower cost of ownership and greater flexibility to meet more business demands.

The disclosed examples may include systems, devices, computer-readable storage media, and methods for generating a natural language programming tool. For purposes of explanation, certain examples are described with reference to the components illustrated in FIGS. 1-3. The functionality of the illustrated components may overlap and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-7 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

What is claimed is:
1. A method comprising:
   initiating discovery of a network device by:

enabling an attached local area network device discovery protocol including enabling of a transmit mode and a receive mode for a network device, and enabling an auxiliary communication protocol that allows devices not directly connected to exchange information on the network device;

obtaining a set of network device discovery protocol records from the network device including local neighbors and connectivity information; and processing topological information about remote neighbors including, correlating and combining connectivity and node (network devices) information, marking inventory and age of a set of topology information records using the auxiliary communication protocol and timing cycles to update age of the set of topology information records.

2. The method of claim 1, wherein the network device discovery protocol is a link level discovery protocol.

3. The method of claim 1, wherein the auxiliary communication protocol is a simple service discovery protocol.

4. The method of claim 1, comprising sending a notification via the auxiliary communication protocol to indicate when the network device is being shut down.

5. The method of claim 1, comprising repeating the steps of initiating, obtaining, and processing at timed intervals.

6. A memory resource storing instructions that when executed cause a processing resource to implement a system to automatically discover network devices, the instructions comprising:

a discovery module that collects a set of network device discovery protocol results about network devices and insert the network device discovery protocol results into a database;

a record module that sends and receives a discovery notification to and from other nodes using an auxiliary communications protocol, capable of reaching non-directly connected devices; and a topology module that coalesces and maintains a set of records related to a network device list, a neighbor information list, an interface information list, and direct connections among the devices with respect to their interfaces.

7. The memory resource of claim 6, wherein the topological module maintains a local copy of a network fabric and the set of topological information records for the network device.

8. The memory resource of claim 6, wherein the instructions are repeated at timed intervals.

9. The memory resource of claim 6, wherein the network device discovery protocol is a link level discovery protocol.

10. The memory resource of claim 6, wherein the auxiliary communication protocol is a simple service discovery protocol.

11. A system comprising:

a discovery engine that enables a network device discovery protocol with a transmit mode and a receive mode on a network device, and enable an auxiliary communication protocol on the network device;

a record engine that broadcasts the network device discovery protocol records from the network device including local neighbors and connectivity information; and a topological engine that processes topological information using the auxiliary communication protocol and timing cycles to update age of a set of topology information records.

12. The system of claim 11, wherein the discovery engine determines if an address is allocated for a management interface on the network device.

13. The system of claim 11, comprising an initiation engine to determine if the network device is provisioned.

14. The system of claim 11 wherein the topological engine marks inventory and topological information regarding the age of stored records.

15. The system of claim 11, wherein the topological engine determines that no renewing information is received from each network device on a network during a first period of time and marks the network device with a first marker.

16. The system of claim 15, wherein the first marker comprises a stale identifier.

17. The system of claim 11, wherein the topological engine determines that no renewing information is received from a network device on a network during a second period of time and marks the network device with a second marker.

18. The system of claim 17, wherein the second marker comprises an obsolete identifier and the network device will be disregarded in all active operations and current topology representations.

19. The system of claim 11, wherein the network device discovery protocol is a link level discovery protocol.

20. The system of claim 11, wherein the auxiliary communication protocol s a simple service discovery protocol.

* * * * *